US010114519B2

(12) United States Patent
Silvis et al.

(10) Patent No.: US 10,114,519 B2
(45) Date of Patent: Oct. 30, 2018

(54) CONTEXTUAL CONTENT PRESENTATION BASED ON MICROENVIRONMENT INTERACTIONS

(71) Applicant: Microsoft Technology Licensing, LLC, Redmond, WA (US)

(72) Inventors: Jason Glenn Silvis, Bellevue, WA (US); Ryan Nakhoul, Issaquah, WA (US); Vidya Srinivasan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/145,464

(22) Filed: May 3, 2016

(65) Prior Publication Data

US 2017/0322678 A1    Nov. 9, 2017

(51) Int. Cl.
G06F 9/44        (2018.01)
G06F 3/048       (2013.01)
G06F 3/0481      (2013.01)
G06F 9/451       (2018.01)
G06F 3/0484      (2013.01)

(52) U.S. Cl.
CPC .......... *G06F 3/0481* (2013.01); *G06F 3/0484* (2013.01); *G06F 9/4443* (2013.01); *G06F 9/4446* (2013.01); *G06F 9/451* (2018.02); *G06F 9/453* (2018.02)

(58) Field of Classification Search
CPC ........ G06F 9/4443; G06F 9/451; G06F 9/453; G06F 9/4446; G06F 3/0481; G06F 11/0766

See application file for complete search history.

(56) References Cited

U.S. PATENT DOCUMENTS 5,736,984 A    4/1998  Jellinek et al.
6,801,230 B2   10/2004 Driskell
(Continued)

OTHER PUBLICATIONS

"International Search Report and Written Opinion issued in PCT Application No. PCT/US17/029548", dated Jun. 30, 2017, 15 Pages.

(Continued)

*Primary Examiner* — Mahelet Shiberou
(74) *Attorney, Agent, or Firm* — Schwegman Lundberg & Woessner, P.A.

(57) ABSTRACT

Presenting contextual content corresponding to interactions associated with microenvironments of user interfaces is described. In an example, the contextual content can be presented via a user interface that includes a plurality of regions. Each region can have localized functionalities that are distinct from, but related to, a global functionality of the user interface. Each region can include one or more elements. The techniques described herein include receiving input indicating an interaction with an element associated with a region. Additionally, the techniques described herein include presenting, based at least partly on the interaction, a notification associated with the interaction in an orientation and/or a style that is based on the element, a container corresponding to the element, and a type of the notification. In an example, the notification can be presented within the region or proximate to the region such to appear at a current focus area of the user interface.

18 Claims, 7 Drawing Sheets

(56) References Cited

U.S. PATENT DOCUMENTS

| | | | |
|---|---|---|---|
| 7,155,729 B1 | 12/2006 | Andrew et al. | |
| 7,251,782 B1* | 7/2007 | Albers | G06F 3/0481 |
| | | | 715/708 |
| 7,681,175 B2 | 3/2010 | Bendapudi | |
| 8,161,399 B2 | 4/2012 | Kannan et al. | |
| 8,233,366 B2 | 7/2012 | Hicks et al. | |
| 8,402,372 B2 | 3/2013 | Gillespie et al. | |
| 8,510,330 B2 | 8/2013 | Brice et al. | |
| 2003/0098887 A1 | 5/2003 | Li | |
| 2003/0103072 A1* | 6/2003 | Ko | G06F 3/04895 |
| | | | 715/710 |
| 2003/0142125 A1 | 7/2003 | Salmimaa et al. | |
| 2003/0212740 A1* | 11/2003 | Berrigan | G06F 17/243 |
| | | | 709/203 |
| 2004/0073815 A1 | 4/2004 | Sanai et al. | |
| 2004/0078734 A1 | 4/2004 | Deuter | |
| 2004/0098462 A1 | 5/2004 | Horvitz et al. | |
| 2004/0250139 A1 | 12/2004 | Hurley | |
| 2005/0166148 A1 | 7/2005 | Garding | |
| 2006/0236253 A1 | 10/2006 | Gusmorino et al. | |
| 2007/0016911 A1 | 1/2007 | Cyktor et al. | |
| 2009/0253516 A1 | 10/2009 | Hartmann et al. | |
| 2011/0004519 A1* | 1/2011 | Aleong | G06Q 10/10 |
| | | | 705/14.53 |
| 2011/0093782 A1 | 4/2011 | Palmer et al. | |
| 2012/0166946 A1 | 6/2012 | Bombolowsky | |
| 2014/0258883 A1* | 9/2014 | Duarte | G06F 17/30598 |
| | | | 715/752 |
| 2014/0280657 A1 | 9/2014 | Miller et al. | |
| 2014/0281870 A1* | 9/2014 | Vogel | G06F 17/246 |
| | | | 715/220 |
| 2015/0177914 A1 | 6/2015 | Coyner et al. | |
| 2015/0365509 A1* | 12/2015 | Park | H04M 19/04 |
| | | | 455/566 |
| 2017/0046057 A1* | 2/2017 | Snuggerud | G06F 3/04847 |
| 2017/0090737 A1* | 3/2017 | Harvey | G06F 8/38 |
| 2017/0315825 A1* | 11/2017 | Gordon | G06F 9/4446 |

OTHER PUBLICATIONS

Anthony, "How to Make Your Form Error Messages More Reassuring", Published on: Aug. 23, 2013 Available at: http://uxmovement.com/forms/how-to-make-your-form-error-messages-more-reassuring/ 13 pages.

* cited by examiner

CONTEXTUAL CONTENT PRESENTATION BASED ON MICROENVIRONMENT INTERACTIONS

BACKGROUND

Computing devices can present notifications via user interfaces to communicate information to users of the computing devices. In some examples, the notifications can include tips on how to use an application, how to interact with a user interface, etc. In other examples, the content can include error notifications, requests for action, etc. Generally, computing devices present static notifications. That is, current techniques for presenting notifications cause content to be presented in a generic location on a user interface. For instance, in some examples, an error notification can be presented in the middle of the user interface. Or, in other examples, an error notification can be pinned to a particular part of the user interface, such as a part of the user interface that is associated with a status area (e.g., a status bar), regardless of where on the user interface a user is interacting. Current techniques do not take into account an importance of the notifications. As a result, users are often disrupted by the presentation of notifications that are not important and/or do not see the notifications because of where and/or how the notifications are presented. Accordingly, presented notifications are often neither useful nor effective in communicating important information.

Additionally, current techniques leverage a computing component configured to receive notifications that are associated with various user interface components, decode each of the notifications, determine how to display each of the notifications, and present the notifications via a user interface. That is, current techniques are computationally expensive.

SUMMARY

The techniques described herein are directed to presenting contextual content corresponding to interactions associated with microenvironments of user interfaces. In an example, the contextual content can be presented via a user interface that includes regions. Each region can have localized functionalities that are distinct from, but related to, a global functionality of the user interface. That is, each region can correspond to a microenvironment. Additionally, each region can include one or more elements. The techniques described herein include receiving input indicating an interaction with an element associated with a region. Additionally, the techniques described herein include presenting, based at least partly on the interaction, a notification associated with the interaction in a position and/or a style that is based at least in part on the element, a container associated with the element, and a type of the notification. In an example, the notification can be presented within the region or proximate to the region so that the notification appears at a current focus area of the user interface.

In at least one example, the techniques described herein are directed to accessing presentation data configured to determine how to present notifications. In some examples, presentation data can be mapped to, or otherwise associated with, individual elements at a time each element is added to a user interface. As such, the techniques described herein enable a computing component to receive a notification associated with an element, access the presentation data corresponding to the element, and present the notification pursuant to the presentation data. The techniques described herein conserve computational resources by eliminating the need for a computing component to receive notifications that are associated with various user interface components, decode each of the notifications, determine how to display each of the notifications, and present the notifications.

Additionally, the techniques described herein improve user efficiency in interacting with user interfaces. The techniques described herein can cause notifications to be presented so that they are consistent with a severity of a notification. Additionally, the techniques described herein can cause notifications to be presented so that they appear within a region or proximate to a region that is a current focus area of a user interface. As a result, the techniques described herein facilitate providing computer users with efficient access to contextual content while minimizing disruption of ongoing user interface interactions. That is, leveraging an understanding of a type of a notification and an element to which the notification corresponds, the techniques described herein can present contextual content that can improve how users interact with user interfaces.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
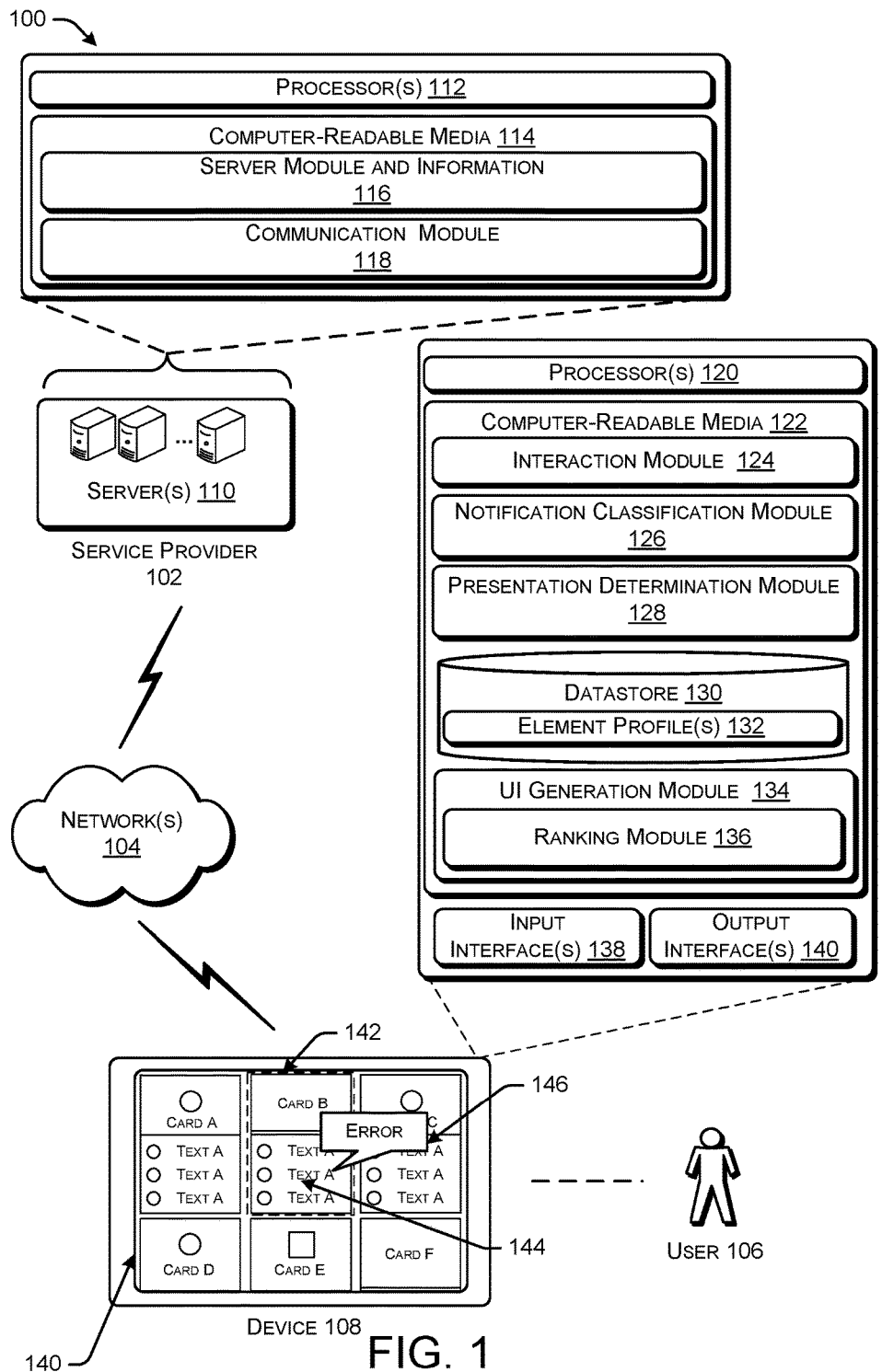
FIG. 1 is a schematic diagram showing an example environment for presenting contextual content corresponding to interactions associated with microenvironments of user interfaces.

This disclosure describes presenting contextual content corresponding to interactions associated with microenvironments of user interfaces. For illustrative purposes, contextual content can correspond to notifications. In at least one example, the techniques described herein include leveraging context associated with interactions on user interfaces to present notifications that are relevant to the interactions in regions of the user interface that are proximate to the interactions. For instance, the context can identify the location on a user interface that is subject to an interaction and/or an element of the user interface that is the subject of the interaction. The location that is subject to the interaction and/or the element that is the subject of the interaction can represent an area of focus on the user interface. The techniques described herein can include presenting notifications intelligently such that notifications are oriented relative to an area of focus on a user interface and/or notifications are presented in a style that is relevant to the type of notification, the element, the interaction, etc.

For illustrative purposes, a microenvironment can correspond to a region of a user interface that is associated with localized functionality. Microenvironments can be associated with regions of any size, shape, configuration, etc. on a user interface. In at least one example, a user interface can be associated with a global functionality and a microenvironment can be associated with a distinct, but related, functionality. As a non-limiting example, a user interface can present a homepage of a collaborative computing environment. Examples of collaborative computing environments include, but are not limited to, MICROSOFT® SHAREPOINT®, DROPBOX®, GOOGLE® DRIVE®, etc. In such examples, the global functionality associated with the user interface can be a collaborative computing environment homepage for presenting content to a user of a collaborative computing environment. In at least one example, the user interface can include a plurality of graphical elements resembling cards. As an illustrative example, a card can be a convenient means of displaying content that serves as an entry point to more detailed information. In an example of a collaborative service application, cards can represent entry points to objects including, but not limited to, team sites, publishing sites, group sites, blogging sites, video channels, image channels, data streaming channels, folders, applications, etc. In at least one example, the region of the user interface corresponding to each card can represent a microenvironment. That is, each card can have one or more localized functionalities that are unique to the card, but are related to the collaborative computing environment.

Each region, or microenvironment, of a user interface can be associated with one or more elements. For illustrative purposes, elements can correspond to graphical elements that offer a visual language to represent information associated with a computing environment. In at least one example, elements can correspond to windows, icons, menus, controls, etc. In at least one example, an element can be associated with a functionality. In the non-limiting example of a user interface that can present a homepage of a collaborative computing environment, each card can include one or more elements. Elements associated with a card can enable a user to request access to objects including, but not limited to, documents, wikis, blog posts, web pages, videos, images, information items, data streams, call to action commands, etc. As a non-limiting example, a card representative of a team site can include elements that can enable a user to access documents (e.g., an article the team is collaborating on, an expense report for the team, a list of items associated with workflow, etc.), images, videos, etc. In such examples, each of the elements can correspond to a list item associated with a list. Alternatively, a card can include an element associated with a call to action that enables a user to follow or favorite the object associated with the card. For instance, an element can enable a user to follow a blog and receive updates when new blog posts are posted. Or, an element can enable a user to follow a video channel and receive updates when new videos are posted. In such examples, the element can be associated with an icon that is pinned to a specific position on a card.

In at least one example, the technologies described herein include presenting contextual content via a user interface that can include multiple regions. As described above, a region can correspond to a microenvironment such that the region can have one or more localized functionalities that are distinct from, but related to, a global functionality of the user interface. In at least one example, each region can include one or more elements that can be associated with various functionalities, as described above. The techniques described herein include receiving, at a client device, input indicating an interaction with an element associated with a region. In at least one example, the techniques described herein include sending, from the client device, data indicating the interaction and a request to implement functionality corresponding to the element to a serving device. The serving device can attempt to implement the functionality associated with the interaction and can generate a notification associated with the request. For instance, in some examples, the notification can indicate that the request failed (e.g., an error notification) or the notification can indicate that the request was successfully completed (e.g., a success notification). In at least one example, the serving device can send notifications to the client device and the client device can determine a notification type associated with each notification. Non-limiting examples of notification types include error notification types, success notification types, request for action notification types, informational notification types, etc. Additional details associated with notification types are described below with reference to FIG. 2.

In at least one example, the techniques described herein are directed to accessing presentation data configured to determine how to present a notification. As described herein, the presentation data can determine an orientation, a style, a timing, etc., associated with presenting a notification. Additionally and/or alternatively, the presentation data can determine the words and/or the message for presenting a notification. In some examples, the presentation data can be mapped to, or otherwise associated with, an element at a time the element is added to a corresponding user interface. The presentation data can be based at least in part on the functionality corresponding to the element, the location of the element on the user interface, a container associated with the element, etc. For illustrative purposes, a container can be a data structure to which an element corresponds. In a non-limiting example of a homepage of a collaborative computing environment, a first element associated with a link to an object can be associated with a card and can be presented on the card in a list. In such an example, the first element can be associated with a list container that is associated with a card container. In an alternative example, a second element presented on a card can be associated with functionality to enable a user to follow or favorite the content associated with the card. In such an example, the second element can be associated with a call to action container that is associated with a card container. The techniques described herein can vary the orientation and/or the style of the presentation of a notification based at least in part on whether the notification is associated with the first element or the second element to ensure that the orientation and/or the style are appropriate for each container. In both examples, however, the notification can be presented within a threshold distance of the corresponding element. And, in both examples, the notification can be presented within the region corresponding to the card or proximate to the region corresponding to the card such to appear at a current focus area of the user interface.

Additionally, the presentation data can be based at least in part on notification types. That is, for each element, the presentation data can determine how to present a notification of each notification type. Accordingly, the techniques described herein enable a computing component to receive a notification associated with an element, determine a notification type associated with a notification, access the presentation data corresponding to the element and notification type, and present the notification pursuant to the presentation data. The techniques described herein can conserve computational resources by eliminating the need for a computing component to receive notifications that are associated with various user interface components, decode each of the notifications, determine how to display each of the notifications, and present the notifications.

The techniques described herein can cause notifications to be presented so that they are consistent with the severity of a notification. Additionally, the techniques described herein can cause notifications to be presented so that they appear within a region or proximate to a region that is a current focus area of a user interface. In at least one non-limiting example, if a notification is associated with an error that affects the local functionality of a microenvironment but does not otherwise affect the global functionality of the corresponding user interface, the notification can be presented such that it is orientated and styled appropriately in view of the severity of the error and the current focus area of the user interface. That is, the notification can be presented proximate to the point of failure, instead of as a static takeover of the whole user interface. As a result, the techniques described herein facilitate providing computer users with efficient access to contextual content while minimizing disruption of ongoing user interface interactions. That is, leveraging an understanding of a type of a notification and an element to which the notification corresponds, the techniques described herein can present contextual content that can improve how users interact with user interfaces.

Illustrative Environments

FIG. 1 is a schematic diagram showing an example environment 100 for presenting contextual content corresponding to interactions associated with microenvironments of user interfaces. More particularly, the example environment 100 can include a service provider 102, network(s) 104, a user 106, and a device 108 associated with the user 106.

The service provider 102 can be any entity, server(s), platform, etc., that facilitates presenting contextual content corresponding to interactions associated with microenvironments of user interfaces as described herein. The service provider 102 can be implemented in a non-distributed computing environment or can be implemented in a distributed computing environment, possibly by running some modules on remotely located devices (e.g., device 108). As shown, the service provider 102 can include one or more servers 110, which can include processor(s) 112 and computer-readable media 114, such as memory. In various examples, the service provider 102 can receive, from a remote device (e.g., device 108), data indicating an interaction with an element of a user interface, process the data in an effort to implement the functionality associated with the element and/or interaction, and send a notification associated with the data to the remote device (e.g., device 108).

In some examples, the network(s) 104 can be any type of network known in the art, such as the Internet. Moreover, the server(s) 110 and/or the device 108 can communicatively couple to the network(s) 104 in any manner, such as by a global or local wired or wireless connection (e.g., local area network (LAN), intranet, etc.). In addition, server(s) 110 and/or device 108 can communicate using any other technology such as BLUETOOTH, WI-FI, WI-FI DIRECT, NFC, or any other suitable light-based, wired, or wireless technology. It should be appreciated that many more types of connections can be utilized than are illustrated in FIG. 1. The network(s) 104 can facilitate communication between the server(s) 110 and the device 108 associated with the user 106.

Examples support scenarios where device(s) that can be included in the one or more servers 110 can include one or more computing devices that operate in a cluster or other configuration to share resources, balance load, increase performance, provide fail-over support or redundancy, or for other purposes. Device(s) that can be included in the one or more servers 110 can include any type of computing device having processor(s) 112 operably connected to computer-readable media 114 such as via a bus, which in some instances can include one or more of a system bus, a data bus, an address bus, a PCI bus, a Mini-PCI bus, and any variety of local, peripheral, and/or independent buses. In at least one configuration, the computer-readable media 114 of the server(s) 110 can include module(s) that facilitate determining relevant content for a user 106. The module(s) can include a server module and information 116 and a communication module 118.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), etc. Device(s) that can be included in the one or more servers 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processor(s) 112 can represent, for example, a CPU-type processing unit, a GPU-type processing unit, a Field-Programmable Gate Array (FPGA), another class of Digital Notification Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-A-Chip Systems (SOCs), Complex Programmable Logic Devices (CPLDs), etc. In various examples, the processor(s) 112 can execute one or more modules and/or processes to cause the server(s) 110 to perform a variety of functions, as set forth above and explained in further detail in the following disclosure. Additionally, each of the processor(s) 112 can possess its own local memory, which also can store program modules, program data, and/or one or more operating systems.

As described above, in at least one configuration, the computer-readable media 114 of the server(s) 110 can include module(s) that receive and send communications to remote device(s), such as device 108. The module(s) can represent pieces of code executing on a computing device. In some examples, a module can include an Application Program Interface (API) to perform some or all of its functionality (e.g., operations). In additional and/or alternative examples, the module(s) can be implemented as computer-readable instructions, various data structures, and so forth via at least one processing unit (e.g., processor(s) 112) to configure a device to execute instructions and to perform operations for communicating with remote device(s) (e.g., device 108). Functionality to perform these operations can be included in multiple devices or a single device.

The server module and information 116 can be configured to manage hardware and services within and coupled to the server(s) 110 for the benefit of other components and/or modules. The communication module 118 can receive data from remote device(s) (e.g., device 108) and can send data to remote device(s) (e.g., device 108). In at least one example, the communication module 118 can send notification(s) to a device 108 in response to receiving data indicating an interaction from the device 108. In other examples, the communication module 118 can push notification(s) to a device 108. That is, in such examples, the communication module 118 can send notification(s) to the device 108 without having received data indicating an interaction from the device 108. For instance, the communication module 118 can push information notifications, request for action notifications, etc. to remote device(s) (e.g., device 108). In at least one example, the notification(s) can be associated with data. For instance, the data can indicate a type of notification, an element that the notification is associated with, etc. Additional details associated with the server module and information 116 and the communication module 118 are described below with reference to FIG. 2.

Depending on the exact configuration and type of the server(s) 110, computer-readable media 114, can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

As described above, a user 106 can operate a device 108 (e.g., user devices) to perform various functions associated with the device 108. The device 108 can represent a diverse variety of device types and are not limited to any particular type of device. Examples of device 108 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital notification processors, or any other sort of processing device, or the like.

The device 108 can include processor(s) 120 and computer-readable media 122. Processor(s) 120 can have a same composition and functionality as the processor(s) 112, described above. The computer-readable media 122 can have a same composition and functionality as the computer-readable media 114, also described above. In at least one configuration, the computer-readable media 122 can include module(s) that can receive notifications from the server(s) 110, access presentation data associated with the notifications based at least in part on receiving the notifications, and present the notifications based at least in part on presentation data, as described below. In at least one example, the module(s) can include an interaction module 124, a notification classification module 126, a presentation determination module 128, a datastore 130 storing element profile(s) 132, a user interface (UI) generation module 134, a ranking module 136, etc. The module(s) can represent pieces of code executing on a computing device. In some examples, a module can include an Application Program Interface (API) to perform some or all of its functionality (e.g., operations). In additional and/or alternative examples, the module(s) can be implemented as computer-readable instructions, various data structures, and so forth via at least one processing unit (e.g., processor(s) 118) to configure a device to execute instructions and to perform operations described herein. Functionality to perform these operations can be included in multiple devices or a single device.

In at least one example, the interaction module 124 can determine interactions between a user 106 and a user interface based at least in part on data received from input interface(s) 138, described below. The notification classification module 126 can receive notifications from the server(s) 110 and can classify the notifications to determine respective notification types. The presentation determination module 128 can leverage the notification type to access, receive, and/or determine presentation data indicating how to present the notification. The datastore 130 can store data that is organized so that it can be accessed, managed, and updated. In at least one example, the datastore 130 can store element profile(s) 132. The element profile(s) 132 can include presentation data mapped to, or otherwise associated with, respective elements. The UI generation module 134 can access and/or receive the presentation data and can send the presentation data with the notification to output interface(s) 140, described below. In at least one example, the UI generation module 134 can receive more than one notification at substantially the same time. In such examples, the ranking module 136 can rank the notifications to determine an order for presenting the notifications.

Device 108 can include the input interface(s) 138 and output interface(s) 140. The input interface(s) 138 can enable input via a keyboard, a keypad, a mouse, a pen, a voice input device, a microphone, a touch input device, a touch sensor, a touch screen, a gestural input device, a joystick, a control button, a scrolling button, a game controller, a camera, a gaze tracking device, a sensing device, or any other device suitable to generate data defining a user interaction with the device 108. The output interface(s) 140 can enable the device 108 to present notifications via a display (e.g., touch screen, liquid crystal display (LCD), hardware surface display, etc.), speakers, haptic interfaces, or the like.

As a non-limiting example, FIG. 1 illustrates an output interface 140 (i.e., a display) presenting a user interface corresponding to a homepage of a collaborative computing environment, as described above. As shown in FIG. 1, the user interface can include various graphical elements resembling cards. Each card can correspond to a microenvironment, as described above. That is, each card can be associated with a local functionality that is distinct from, but related to, the global functionality of the user interface. As illustrated, CARD B corresponds to a microenvironment 142. The microenvironment 142 associated with CARD B can be associated with one or more functionalities that are local to CARD B and may not affect other microenvironments in the user interface. For instance, if a user 106 interacts with a text element 144 associated with CARD B, CARD A or CARD F may not be affected. In at least one example, a user 106 can interact with the text element 144 and, responsive to the interaction, can be presented with a notification 146. As a non-limiting example, the notification 146 can relay to the user 106 that there was an error resulting from his or her interaction with text element 144. As illustrated in FIG. 1, the notification 146 can be presented on the user interface proximate to the text element 144 and/or the microenvironment 142. That is, the notification 146 can be presented within a threshold distance of the text element 144 and/or the microenvironment 142. Additional details associated with presentation of notifications are described below with reference to FIG. 3.

Figure 2:
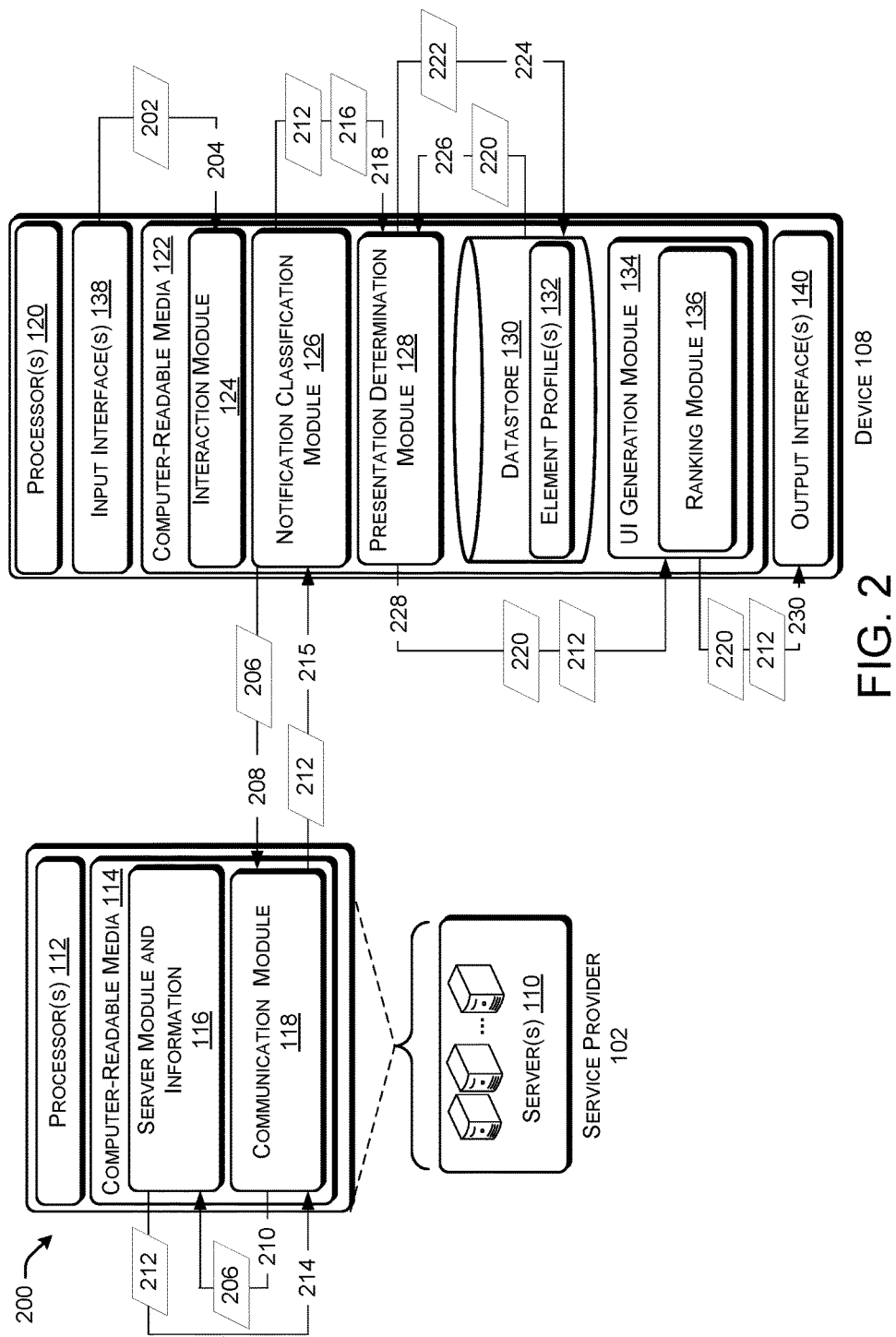
FIG. 2 is a schematic diagram showing how data can flow through an example environment for presenting contextual content corresponding to interactions associated with microenvironments of user interfaces.

FIG. 2 illustrates data flow through an example environment 200 for presenting contextual content corresponding to interactions associated with microenvironments of user interfaces. FIG. 2 is a non-limiting example of how data can flow through the example environment 200. It should be appreciated that many more types of data flows can be utilized than are illustrated in FIG. 2.

As described above, device 108 can include input interface(s) 138. In at least one example, a user 106 can interact with the user interface(s) via input interface(s) 138, as described above. In some examples, a user 106 can actuate a control (e.g., a hyperlink or overlay) on the user interface that corresponds to an object to launch a homepage associated with the object or take the user 106 to a location of the object, respectively. The user 106 can actuate the control by clicking, touching, or otherwise selecting the control. Furthermore, in additional and/or alternative examples, the user 106 can interact with the user interface by actuating a control corresponding to a call to action (e.g., share, follow, send in message, etc.). In such examples, the control described above can correspond to an element. In additional and/or alternative examples, input interface(s) 138 such as a gaze tracking device and/or camera can determine that an element corresponds to a gaze target of the user 106. That is, input interface(s) 138 such as a gaze tracking device and/or camera can determine a user 106 is looking at an element. In such examples, determining that an element corresponds to a gaze target of a user 106 can indicate an interaction between the user 106 and the element.

The input interface(s) 138 can send input data 202 to the interaction module 124 indicating interaction with the user interface(s) via the input interface(s) 138, as shown by line 204. In at least one example, the input data 202 can identify the interaction and the element on the user interface that is the subject of the interaction. The interaction module 124 can receive the input data 202 from input interface(s) 138 and can send implementation data 206 to the communication module 118, as shown by line 208. In at least one example, implementation data 206 can identify the element that the user 106 interacted with and the interaction, and can request implementation of the functionality corresponding to the element and/or interaction. The communication module 118 can receive the implementation data 206 from the device 108. In a non-limiting example, an element can be associated with a call to action such as a follow functionality or a favorite functionality that enables a user 106 to follow an object, such as a website, a blog, a collaborative data repository, etc., as described above. In such an example, the communication module 118 can receive implementation data 206 that can indicate that a user 106 interacted with the element associated with the follow functionality or the favorite functionality and request implementation of the corresponding functionality. That is, the implementation data 206 can include a command to execute one or more actions so that the user 106 can follow the corresponding object.

The communication module 118 can exchange data with the server module and information 116. As described above, the server module and information 116 can be configured to manage hardware and services within and coupled to the server(s) 110 for the benefit of other components and/or modules. For instance, the server module and information 116 can access and/or receive the implementation data 206 from the communication module 118, as shown by line 210. The server module and information 116 can process the implementation data 206 in an effort to implement functionality associated with the element and/or interaction. The server module and information 116 can send a notification 212 associated with the requested implementation to the communication module 118, as shown by line 214.

In some examples, the notification 212 can be associated with data identifying a result of the requested implementation. In at least one example, the notification 212 can be an error notification indicating that the request could not be completed. In some examples, the notification 212 can indicate why the request could not be completed. For instance, the notification 212 can indicate that the request failed or an object that was the subject of the request was not found. In other examples, the notification 212 can be a success notification, indicating that the request was performed. For instance, in the non-limiting example above, the notification 212 can indicate that a user 106 is now following the website, the blog, the collaborative data repository, etc. In additional and/or alternative examples, the notification 212 can be a request for action notification, an informative notification, etc. As a non-limiting example, a request for action notification can request an administrative action required prior to performing requested functionality. As another non-limiting example, an informative notification can communicate a tip or recommendation associated with requested functionality.

The communication module 118 can send a notification 212 to the notification classification module 126, as shown by line 215. The notification classification module 126 can classify the notification 212 to determine a notification type. Each notification 212 can be associated with a different type of notification. For illustrative purposes, a type of notification can be determined based on the information that the notification conveys. That is, notifications that convey that requested functionality was not able to be performed, that the requested was not recognized, that implementing the requested functionality is not permitted, etc. can be error notification types. Alternatively, notifications that convey that the requested functionality was successfully implemented can be success notification types. Additionally, notifications that convey a request for action can be request for action notification types and notifications that convey information can be information notification types. Various other notification types can be imagined.

In at least some examples, the notification type can be more specific than an error notification type, a success notification type, etc. For instance, in at least one example, the notification type can identify a particular error notification, a particular success notification, etc. As a non-limiting example, the notification type can identify an access denied error notification, a file not found error notification, etc. In at least one example, data associated with the notification 212 received from the communication module 118 can indicate the notification type of the notification 212. In such examples, the notification classification module 126 can access the data associated with the notification 212 to determine the notification type.

In additional and/or alternative examples, the notification classification module 126 can leverage one or more machine learning mechanisms to determine the notification type of a notification 212. For illustrative purposes, machine learning mechanisms can include one or more programs that learn from data that it receives. For example, a machine learning mechanism can build, modify or otherwise utilize a data model that is created from example inputs and make predictions or decisions using the data model. In the current example, the data model can be used to determine a notification type. The data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the notification classification module 126 can utilize semantic mining of notifications 212 to identify words associated with the notifications (e.g., "error," "success," "action requested," etc.). The words can be leveraged as input into the data model and the data model can determine a notification type based on the input.

The notification classification module 126 can send notification type data 216 and the notification 212 to the presentation determination module 128, as shown by line 218. The presentation determination module 128 can leverage the notification type data 216 to access, receive, and/or determine presentation data 220 indicating how to present the notification 212. In at least one example, the presentation data 220 can be mapped to, or otherwise associated with, an element and can be stored in the datastore 130 in a corresponding element profile 132, as described below. In such examples, the presentation determination module 128 can access or receive the presentation data 220 from the datastore 130. That is, the presentation determination module 128 can send a request 222 including an identification of the element and the notification type, as shown by line 224. The datastore can send corresponding presentation data 220 back to the presentation determination module 128, as shown by line 226. Alternatively, the presentation determination module 128 can access the datastore 130 and the corresponding presentation data 220.

In some examples, an element may not be associated with presentation data 220. In such examples, the content determination module 128 may leverage one or more machine learning mechanisms to determine presentation data 220. As described above, machine learning mechanisms can include one or more programs that learn from data that it receives. In at least one example, a machine learning mechanism can be used to determine an orientation, style, message, timing, etc. associated with presenting a notification based on an interaction with an element on a user interface. The data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc., as described above. In such examples, the presentation determination module 128 can determine contextual data associated with an element. The contextual data can indicate the element that is the subject of an interaction, a location of the element on the user interface, a function associated with the element, at least one container associated with the element, a location of the at least one container associated with the element, etc. The presentation determination module 128 can apply a data model to the contextual data and data indicating the notification type to determine an orientation, style, message, timing, etc. associated with presenting a notification 212.

As described above, the datastore 130 can store data that is organized so that it can be accessed, managed, and updated. The presentation determination module 128 can access and/or receive presentation data 220 from the datastore 130. In at least one example, the datastore 130 can store element profile(s) 132. At a time an element is added to a user interface, a corresponding element profile 132 can be added to the datastore 130. The element profile 132 can include data that is mapped to, or otherwise associated with, the element. That is, at the time an element is added to a user interface, the corresponding element profile 132 can be populated to include data associated with the element and presentation data, as described below. The data in the element profile 132 can be updated and/or modified subsequent to the time the element is added to the user interface. In at least one example, the data associated with the element profile 132 can indicate one or more functionalities associated with the element, a location of the element on a user interface, etc.

Additionally, the data can identify one or more containers associated with the element and a type of each of the one or more containers. In at least one example, an element can be associated with a first container which can be hierarchically related to a second container and so forth. As a non-limiting example, an element can be associated with a list. That is, the first container associated with the element is the list item. In some examples, the list item can be associated with a card, as described above. In such examples, the second container associated with the element is the card. In other examples, the list item can be associated with a panel of list items associated with the user interface. In such examples, the second container associated with the element is the panel. Such hierarchical relationships can be mapped to, or otherwise associated with, an element profile 132.

Additionally and/or alternatively, the data that can be mapped to, or otherwise associated with, an element profile 132 can include presentation data 220 indicating how to present notifications 212. In at least one example, the presentation data 220 can indicate an orientation for a corresponding notification 212, a style of the corresponding notification 212, a message for conveying the corresponding notification 212, a timing associated with the presentation of the corresponding notification 212, etc. The presentation data 220 can be determined for each element based at least in part on a container with which the element is associated, a location of an element and/or corresponding container on a user interface, and/or a container type with which the element is associated. In some examples, the presentation data 220 can be determined based at least in part on combinations of container types and/or hierarchical relationships between the containers associated with the element.

In at least one example, elements associated with a same container type can have substantially similar presentation data 220. Alternatively, elements associated with different container types can have different presentation data 220. In examples where elements can be associated with one or more containers, elements associated with a same combination of container types having same hierarchical relationships can have substantially similar presentation data 220. That is, in at least one example, the presentation data 220 that can be mapped to, or otherwise associated with, element profiles 132 corresponding to elements having a same functionality, that are associated with a same combination of containers in a same hierarchical order, can be the same such that notifications 212 that are the same type of notification can be presented in a substantially same orientation, in a substantially same style, at a substantially same timing, etc. Alternatively, elements associated with different combinations of container types and/or different hierarchical relationships between the container types can have different presentation data 220.

In at least one example, however, elements associated with a same container type can be located in different positions on a user interface. In such examples, a first element and a second element can be associated with a substantially similar style of presenting notifications (e.g., both a notification associated with the first element and a notification associated with the second element can be callouts with a similar presentation style); however, the orientation of the notifications can change based on where on the user interface the first element and the second element are located. For instance, as a non-limiting example, if the first element is associated with presentation data 220 that can cause the notification 212 to be presented above the first element, and if the second element is close to the top of the user interface, the presentation data 220 can cause the notification to be presented to the left or the right of the second element. That is, the location of the element and/or container can be used to determine presentation data 220.

In at least one example, individual notification types can be mapped to, or otherwise associated with, presentation data 220 that is mapped to, or otherwise associated with, each element profile 132. For instance, in each element profile 132, the presentation data 220 can indicate how to present a notification associated with each notification type. As a non-limiting example, the presentation data 220 can indicate how to present an error type notification, how to present a success type notification, how to present a request for action type notification, an information type notification, etc. As described above, in some examples, the notification types can be more specific than those described above. That is, in at least one example, an element profile 132 can include presentation data 220 that indicates how to present a request for individual error notifications (e.g., access denied, file not found, page fault, etc.).

In some examples, the presentation data 220 can be specific to a device type. That is, the presentation data 220 corresponding to a notification type and an element on a first device can be different than the presentation data 220 for the same notification type and same element on a second device. Various aspects of different devices, including, but not limited to, the size of the display, the orientation of the display, etc. can cause the presentation data 220 to change for each of the different device types.

As described above, the presentation data 220 can include data indicating an orientation for a notification 212, a style of the notification 212, a message for conveying the notification 212, a timing associated with the presentation of the notification 212, etc. In at least one example, the orientation can determine where a graphical representation of a notification 212 is rendered on a user interface in relation to an element associated with the notification 212. In some examples, the presentation data 220 can indicate that a notification 212 is to be rendered above the element. In other examples, the presentation data 220 can indicate that a notification 212 is to be rendered below the element. In yet additional and/or alternative examples, the presentation data 220 can indicate that a notification 212 is to be rendered to the left of the element or to the right of the element.

Additionally and/or alternatively, the presentation data 220 can include spacing and/or positioning associated with the presentation of the notification 212. In at least one example, the presentation data 220 can indicate that a notification 212 is to be presented within a threshold distance of the element on the user interface. For instance, in some examples, the presentation data 220 can indicate that a notification 212 is to be presented within a set distance (e.g., 2 cm, 3 cm, 5 cm, etc.) of the element. Alternatively, in other examples, the presentation data 220 can indicate that a notification 212 is to be presented within a variable distance that can be determined based on a dimension (e.g., height, width, etc.) of the element. Additionally or alternatively, the presentation data 220 can indicate that a notification 212 is to be presented within a predetermined number of pixels of the element and/or at a distance relative to the element that corresponds to the predetermined number of pixels.

In additional and/or alternative examples, the presentation data 220 can indicate a particular position where the notification 212 is to be presented relative to the element, a card associated with the element, a region associated with the card and/or the element, etc. For instance, in at least one example, the presentation data 220 can indicate that the notification 212 is to be presented within an element and/or card, in a particular region of an element and/or a card, visibly touching (e.g., overlapping) at least some part of an element and/or a card, etc. In a non-limiting example, presentation data 220 can indicate that a banner is to be presented in a particular position on a card or a callout is to be pinned to a particular position on a portion of the user interface corresponding to the element. Additional details associated with the presentation of notifications 212 are described below with reference to FIG. 3.

The style of the notification can determine how a notification 212 appears when it is presented. In at least one example, the presentation data 220 can indicate whether to present the notification 212 as a banner, a callout, a dialog, a flash, an animation, a gesture, a graphic, etc. Additionally, the presentation data 220 can indicate a design and/or configuration of each notification 212. For instance, the presentation data 220 can indicate a size of a graphical representation of the notification, a color associated with a graphical representation of a notification 212, a font associated with text associated with the graphical representation, etc.

Moreover, the presentation data 220 can indicate a message for conveying a notification 212. That is, the presentation data 220 can indicate the textual representation of the notification that can be associated with a graphical representation. For instance, as a non-limiting example, the presentation data 220 can indicate that a notification corresponding to an error can include the message "There was an error in completing your request" or, alternatively, "Sorry, we couldn't complete this task because of an error."

Additionally and/or alternatively the presentation data 220 can indicate a length of time for presenting a notification 212. For instance, the presentation data 220 can indicate to present a notification 212 for a predetermined amount of time, until a user 106 dismisses the notification 212, etc.

In some examples, the presentation determination module 128 can send the presentation data 220 and the notification 212 to the UI generation module 134, as shown by line 228. The UI generation module 134 can access and/or receive the presentation data 220 and the notification 212 and can send the presentation data 220 and the notification 212 to output interface(s) 140, as shown by line 230. The output interface(s) 140 can enable the device 108 to present the notifications 212 based at least in part on the presentation data 220. In at least one example, the output interface(s) 140 can cause the notifications 212 to be rendered on a user interface via a display of a device 108.

In at least one example, the UI generation module 134 can receive more than one notification 212 at substantially the same time. In such examples, the ranking module 136 can rank the notifications 212 to determine an order for presenting the notifications 212. In at least one example, the ranking module 136 can rank the notifications 212 based at least in part on a severity of the notification 212. That is, in some examples, the ranking module 136 can rank the notifications 212 based at least in part on how critical a notification 212 is to the device 108. For instance, if a first notification is associated with a system crash error and a second notification is associated with a request for action, the ranking module 136 can rank the notifications such that the first notification is ranked first and the second notification is ranked second.

In other examples, the ranking module 136 can rank the notifications based at least in part on the relevance of the first notification and the second notification to the user 106. In such examples, the ranking module 136 can access data associated with an element corresponding to the first notification to determine a weight associated with the element. The weight can be indicative of how relevant the element is to the user 106. In at least one example, a weight associated with an element can be determined based at least in part on a frequency and/or regularity of interaction(s) with the element and/or a container associated with the element, a recency of interaction(s) with the element and/or a card associated with the element, who is interacting with the element and/or a card associated with the element, etc. Similarly, the ranking module 136 can access data associated with an element corresponding to the second notification to determine a weight associated with the element. In such examples, the ranking module 136 can rank the notifications based at least in part on the weights that are associated with the elements corresponding to each notification. That is, if the first notification is associated with an element that has a higher weight than the element associated with the second notification, the ranking module 136 can rank the first notification higher than the second notification.

When the UI generation module 134 receives two or more notifications at substantially the same time, the UI generation module 134 can leverage the order determined by the ranking module 136 to determine the order for sending corresponding presentation data 220 and the notification 212 to the output interface(s) 140. That is, the UI generation module 134 can send presentation data 220 and the notification 212 associated with top ranked notification to the output interface(s) 140 prior to sending presentation data 220 and notification 212 associated with a lower ranked notification.

In at least one example, the communication module 118 can push notifications 212 in addition to and/or alternative to sending notifications 212 responsive to receiving implementation data 206. In such examples, the notification classification module 126 can determine which element of a user interface the notification 212 is associated with. In some examples, the notification classification module 126 can access data associated with the notification 212 to make said determination. In such examples, the remaining process and data flow described in FIG. 2 can be performed such to cause the notification 212 to be presented via output interface(s) 140.

Figure 3:
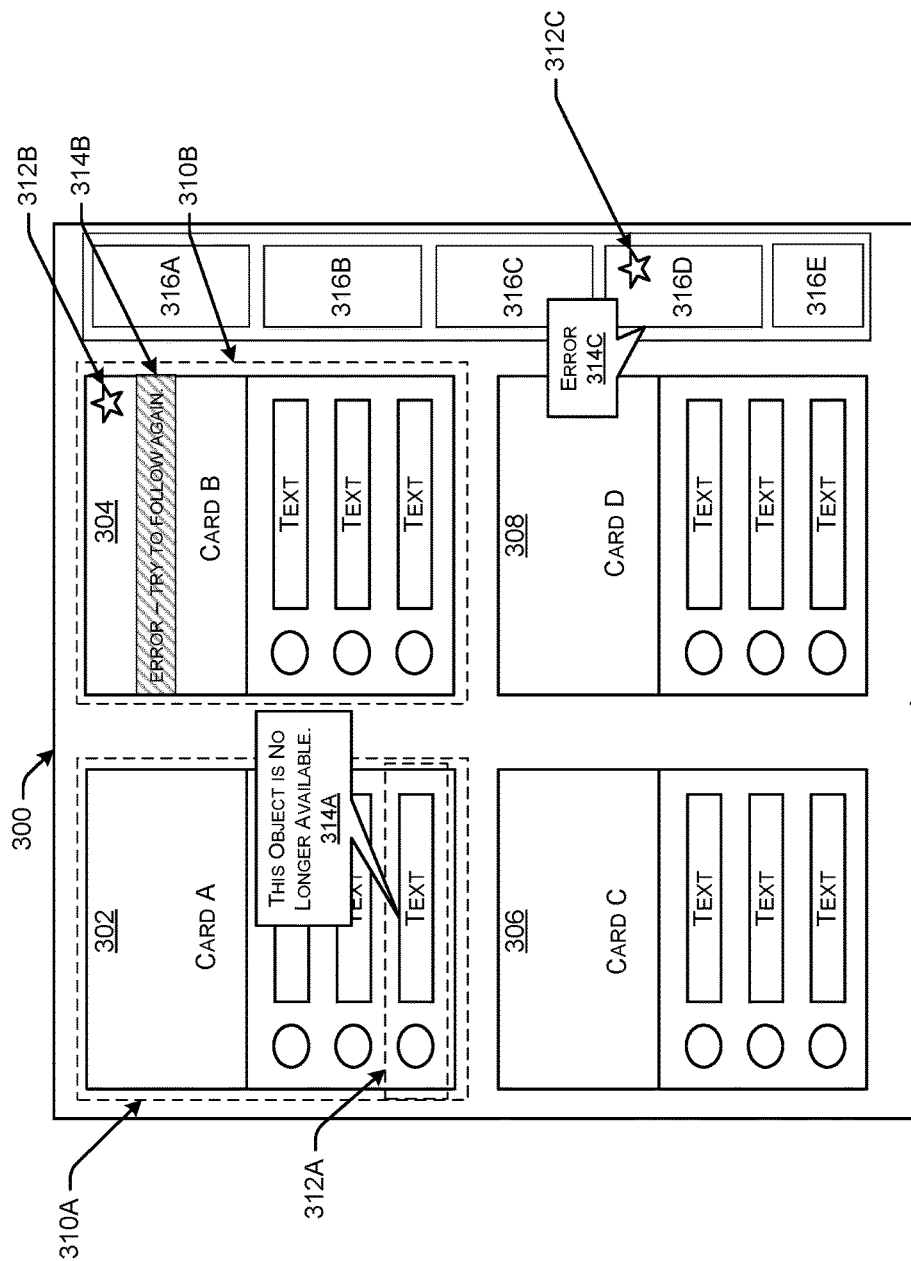
FIG. 3 is a schematic diagram that illustrates an example user interface as described herein.

FIG. 3 is an example user interface 300 as described herein. As described above, output interface(s) 140 can present notifications based at least in part on the presentation data. In FIG. 3, the user interface 300 can be presented via a display of a device 108. The user interface 300 can be associated with a global functionality. As a non-limiting example, user interface 300 is illustrated as an example of a content page corresponding to a collaborative service application, as described above. In at least one example, user interface 300 can include a plurality of graphical representations of cards that can correspond to objects, as described above. Each of the cards can be associated with one or more elements, as described above.

User interface 300 includes four cards: CARD A 302, CARD B 304, CARD C 306, and CARD D 308. The region of the user interface 300 corresponding to each card can be associated with a microenvironment, as described above. That is, the region of the user interface 300 corresponding to each card can have localized functionality. For instance, CARD A can be associated with a microenvironment 310A such that a user 106 can interact with CARD A 302 or a corresponding element 312A, and resulting functionalities can be associated with the microenvironment 310A. That is, the resulting functionality can be local to the microenvironment 310A and may not affect the other microenvironments (e.g., microenvironment 310B, etc.) associated with the user interface 300.

As described above, presentation data associated with individual elements can determine how notifications can be presented via the user interface 300. For instance, in a non-limiting example, a user 106 can interact with element 312A in an effort to access an object associated with the element 312A. Based at least in part on the interaction, device 108 can receive a notification indicating that the request to access the object was denied. That is, the notification can indicate that there was an error in attempting to access the object. In some examples, the notification can include information as to why the attempt to access the object failed. As a non-limiting example, a graphical representation of the notification can be presented to communicate that the requested object is no longer available, as illustrated in callout 314A. The presentation data associated with element 312A can indicate that, based at least in part on receiving an error type notification, the notification is to be presented as a callout 314A on the user interface 300. Additionally, as described above, the presentation data can indicate an orientation associated with the callout 314A. For instance, the presentation data can indicate that the callout 314A is to be positioned to the right of the element 312A and above the element 312A. Additionally and/or alternatively, the style of the callout 314A can be determined based at least in part on the presentation data associated with the element 312A. Furthermore, the message associated with the callout 314A ("This message is no longer available.") can be determined based at least in part on the presentation data associated with the element 312A.

As illustrated, element 312B associated with CARD B is a different element. For instance, element 312B can be a control associated with a call to action request, such as a follow or a favorite request. That is, by actuating the control associated with element 312B, the user 106 can request to follow or favorite the corresponding object. In some examples, such an action can enable a user 116 to receive updates associated with the object (e.g., new blogposts, new videos, etc.). The presentation data associated with element 312B can indicate a different orientation and style for notifications associated with element 312B. As illustrated, the presentation data can indicate that error type notifications are to be presented as banners on the user interface 300, as illustrated by banner 314B. The presentation data can indicate that the banner 314B is to be presented in a particular position on the corresponding card. Additionally and/or alternatively, the presentation data can indicate a style of the banner 314B, the message associated with the banner 314B ("Error—Try to follow again."), etc.

In at least one example, the user interface 300 can include a panel that includes one or more panel elements 316A-316E. The panel can include any number of panel elements 316A-316E. In at least one example, a panel element (e.g., element 316D) can include an element 312C. The element 312C can be a control associated with a call to action, such as a follow or a favorite request. That is, element 312C can be a same type of element 312B. However, the container associated with element 312B is different than the panel element associated with element 312C. Accordingly, the presentation data can cause notifications to be presented differently because the containers associated with the elements are different (e.g., card vs. panel element). In a non-limiting example, as illustrated in FIG. 3, the presentation of the notification associated with element 312C can have a different orientation and style than the presentation of the notification associated with element 312B. As illustrated, the presentation data can indicate that error type notifications associated with call to action elements corresponding to element 312C associated with a panel element can be presented as a callout on the user interface 300, as illustrated by callout 314C. The presentation data can indicate that the callout 314C can be presented in a particular orientation relative to the element 312C. Additionally and/or alternatively, the presentation data can indicate a style of the callout 314C, a message associated with the callout 314C ("Error"), etc.

User interface 300 is but one example of a user interface that can be presented via the technologies described herein. Additional and/or alternative configurations are available for presenting contextual content based on microenvironment interactions. For instance, contextual content can be presented in association with microenvironment interactions in mailing services applications, administrative services applications, etc. For instance, in a mailing services application a region of a user interface corresponding to a calendar can be associated with a first microenvironment and a region of the user interface corresponding to received email messages (e.g., an inbox) can correspond to a second microenvironment. Alternatively, in an administrative services application, individual administrative tasks can correspond to individual microenvironments.

Example Processes

The processes described in FIGS. 4-7 below are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
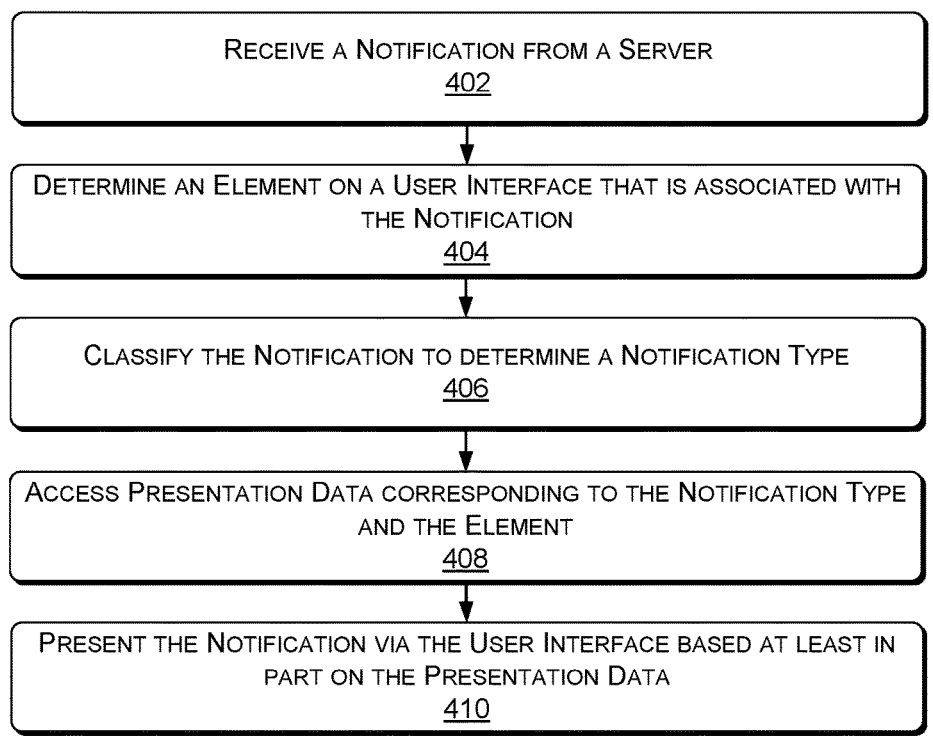
FIG. 4 is a flow diagram that illustrates an example process to present contextual content corresponding to interactions associated with microenvironments of user interfaces based at least in part on a notification received from a serving device.

FIG. 4 illustrates an example process 400 to present contextual content corresponding to interactions associated with microenvironments of user interfaces based at least in part on a notification received from a serving device.

Block 402 illustrates receiving a notification from a server (e.g., server(s) 110). As described above, the communication module 118 can receive data from remote device(s) (e.g., device 108) and can send data to remote device(s) (e.g., device 108). In at least one example, the communication module 118 can send notification(s) to a device 108 in response to receiving data indicating an interaction from the device 108. In other examples, the communication module 118 can push notification(s) to a device 108. That is, in such examples, the communication module 118 can send notification(s) to the device 108 without having received data indicating an interaction from the device 108. In the examples described above, the notification classification module 126 can receive the notification(s).

Block 404 illustrates determining an element on a user interface that is associated with the notification. In at least one example, the notification classification module 126 can determine which element of a user interface a notification is associated with. In some examples, the notification classification module 126 can access data associated with the notification to make said determination, as described above.

Block 406 illustrates classifying the notification to determine a notification type. The notification classification module 126 can classify the notification to determine a notification type, as described above. Each notification can be associated with a different type of notification. For illustrative purposes, a type of notification can be determined based on the information that the notification conveys. In at least one example, data associated with the notification received from the communication module 118 can indicate the notification type of the notification. In such examples, the notification classification module 126 can access the data associated with the notification to determine the notification type. In additional and/or alternative examples, the notification classification module 126 can leverage one or more machine learning mechanisms to determine the notification type of a notification, as described above.

Block 408 illustrates accessing presentation data corresponding to the notification type and the element. The presentation determination module 128 can leverage the notification type data 216 to access, receive, and/or determine presentation data indicating how to present the notification. In at least one example, the presentation data can be mapped to, or otherwise associated with, an element and can be stored in the datastore 130 in a corresponding element profile 132, as described below. In such examples, the presentation determination module 128 can access or receive the presentation data from the datastore 130. In some examples, an element may not be associated with presentation data. In such examples, the content determination module 128 may leverage one or more machine learning mechanisms to determine presentation data, as described above.

Block 410 illustrates presenting the notification via the user interface based at least in part on the presentation data. In some examples, the presentation determination module 128 can send the presentation data and the notification to the UI generation module 134, as described above. The UI generation module 134 can access and/or receive the presentation data and the notification and can send the presentation data and the notification to output interface(s) 140. The output interface(s) 140 can enable the device 108 to present the notifications 212 based at least in part on the presentation data. In at least one example, the output interface(s) 140 can cause the notifications 212 to be rendered on a user interface via a display of a device, as described above with reference to FIG. 3.

Figure 5:
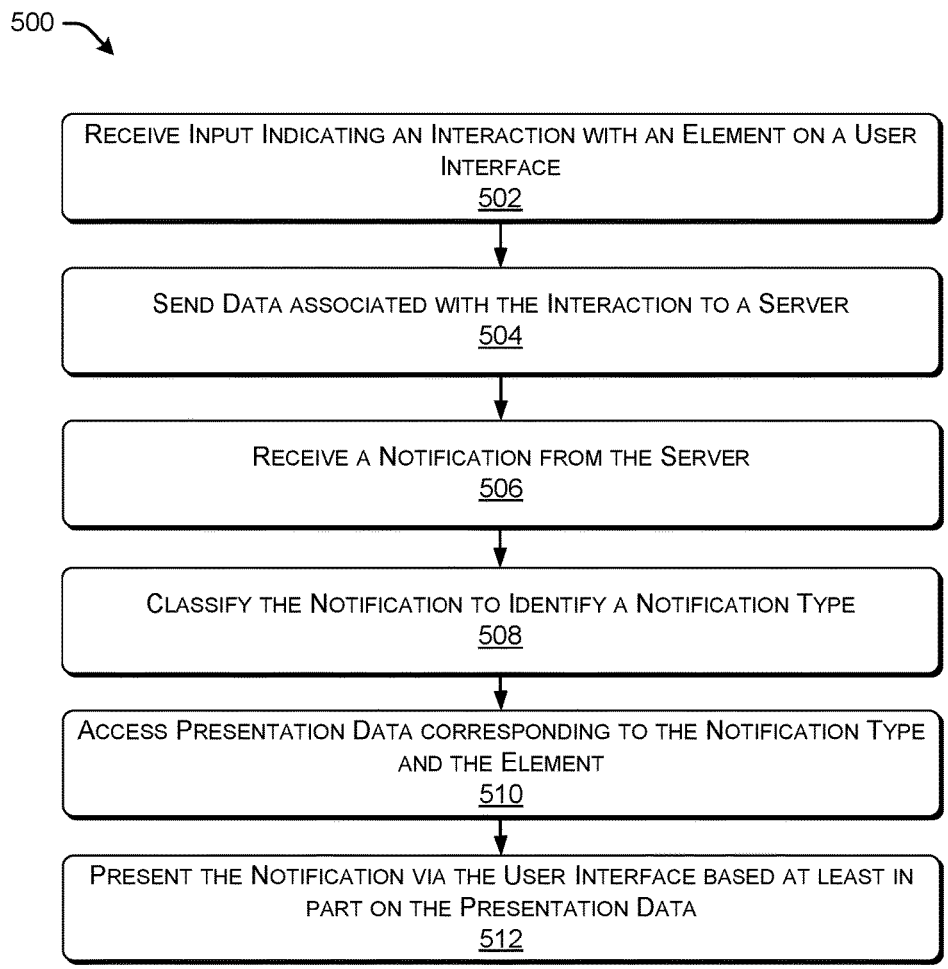
FIG. 5 is a flow diagram that illustrates another example process to present contextual content corresponding to interactions associated with microenvironments of user interfaces based at least in part on a notification received from a serving device.

FIG. 5 illustrates an example process 500 to present contextual content corresponding to interactions associated with microenvironments of user interfaces based at least in part on a notification received from a serving device.

Block 502 illustrates receiving input indicating an interaction with an element on a user interface. In at least one example, a user 106 can interact with the user interface(s) via input interface(s) 138, as described above. The input interface(s) 138 can send input data to the interaction module 124 indicating an interaction with the user interface(s) via the input interface(s) 138. In at least one example, the input data can identify the interaction and the element on the user interface that is the subject of the interaction.

Block 504 illustrates sending data associated with the interaction to a server (e.g., server(s) 110). The interaction module 124 send implementation data to the communication module 118. In at least one example, implementation data can identify the element that the user 106 interacted with and the interaction, and can request implementation of the functionality corresponding to the element and/or interaction. The communication module 118 can receive the implementation data from the device 108, as described above.

Block 506 illustrates receiving a notification from the server. The communication module 118 can send a notification to the notification classification module 126 and the notification classification module 126 can receive the notification. In some examples, the notification can be associated with data identifying a result of the requested implementation, as described above.

Block 508 illustrates classifying the notification to determine a notification type. The notification classification module 126 can classify the notification to determine a notification type. Each notification can be associated with a different type of notification. For illustrative purposes, a type of notification can be determined based on the information that the notification conveys, as described above. In at least one example, data associated with the notification received from the communication module 118 can indicate the notification type of the notification. In such examples, the notification classification module 126 can access the data associated with the notification to determine the notification type. In additional and/or alternative examples, the notification classification module 126 can leverage one or more machine learning mechanisms to determine the notification type of a notification, as described above.

Block 510 illustrates accessing presentation data corresponding to the notification type and the element. The presentation determination module 128 can leverage the notification type data 216 to access, receive, and/or determine presentation data indicating how to present the notification. In at least one example, the presentation data can be mapped to, or otherwise associated with, an element and can be stored in the datastore 130 in a corresponding element profile 132, as described above. In such examples, the presentation determination module 128 can access or receive the presentation data from the datastore 130. In some examples, an element may not be associated with presentation data. In such examples, the content determination module 128 may leverage one or more machine learning mechanisms to determine presentation data, as described above.

Block 512 illustrates presenting the notification via the user interface based at least in part on the presentation data. In some examples, the presentation determination module 128 can send the presentation data and the notification to the UI generation module 134, as described above. The UI generation module 134 can access and/or receive the presentation data and the notification and can send the presentation data and the notification to output interface(s) 140. The output interface(s) 140 can enable the device 108 to present the notifications 212 based at least in part on the presentation data. In at least one example, the output interface(s) 140 can cause the notifications 212 to be rendered on a user interface via a display of a device, as described above with reference to FIG. 3.

Figure 6:
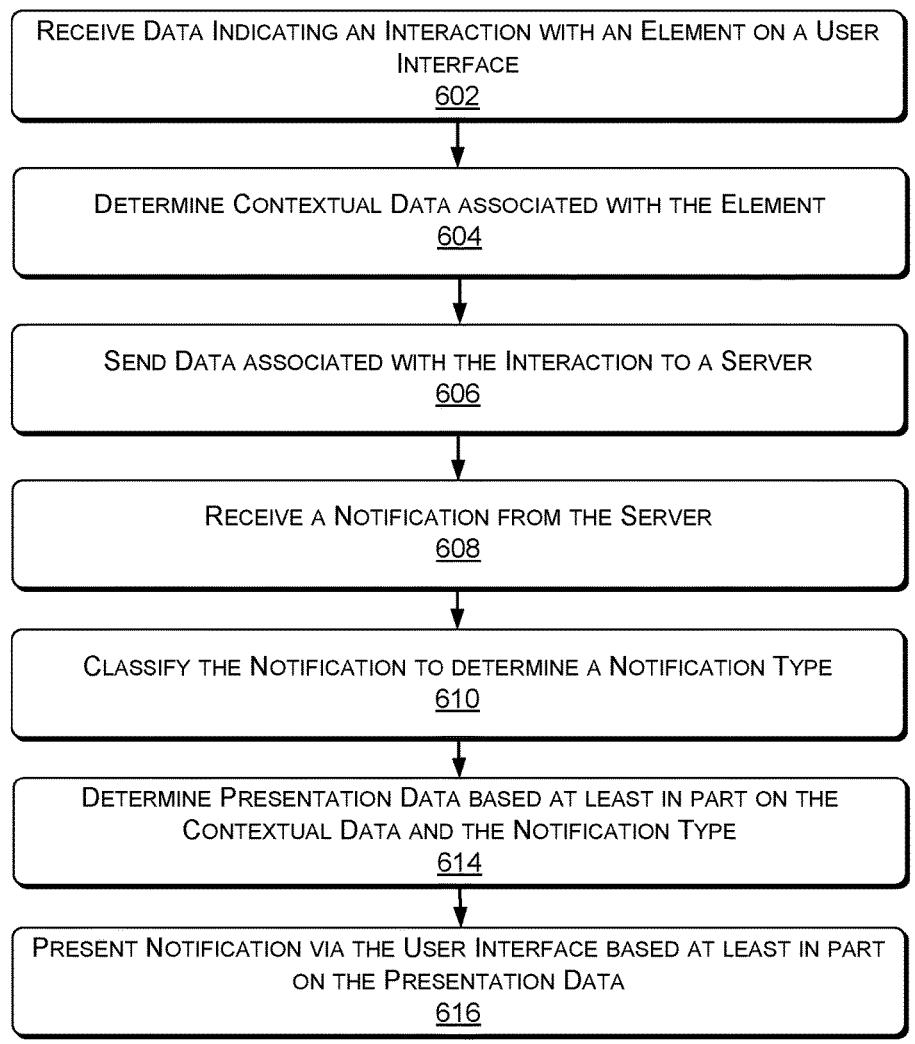
FIG. 6 is a flow diagram that illustrates an example process to determine presentation data associated with content corresponding to interactions associated with microenvironments of user interfaces and to present contextual content based at least in part on the presentation data.

FIG. 6 illustrates an example process 600 to determine presentation data associated with content corresponding to interactions associated with microenvironments of user interfaces and presenting contextual content based at least in part on the presentation data.

Block 602 illustrates receiving input indicating an interaction with an element on a user interface. In at least one example, a user 106 can interact with the user interface(s) via input interface(s) 138, as described above. The input interface(s) 138 can send input data to the interaction module 124 indicating an interaction with the user interface(s) via the input interface(s) 138. In at least one example, the input data can identify the interaction and the element on the user interface that is the subject of the interaction.

Block 604 illustrates determining contextual data associated with the element. In at least one example, the presentation determination module 128 can determine contextual data associated with an element. The contextual data can indicate a location of the element on the user interface, a function associated with the element, at least one container associated with the element, a location of the at least one container associated with the element, etc.

Block 606 illustrates sending data associated with the interaction to a server (e.g., server(s) 110). The interaction module 124 send implementation data to the communication module 118. In at least one example, implementation data can identify the element that the user 106 interacted with and the interaction, and can request implementation of the functionality corresponding to the element and/or interaction. The communication module 118 can receive the implementation data from the device 108, as described above.

Block 608 illustrates receiving a notification from the server. The communication module 118 can send a notification to the notification classification module 126 and the notification classification module 126 can receive the notification. In some examples, the notification can be associated with data identifying a result of the requested implementation, as described above.

Block 610 illustrates classifying the notification to determine a notification type. The notification classification module 126 can classify the notification to determine a notification type. Each notification can be associated with a different type of notification. For illustrative purposes, a type of notification can be determined based on the information that the notification conveys, as described above. In at least one example, data associated with the notification received from the communication module 118 can indicate the notification type of the notification. In such examples, the notification classification module 126 can access the data associated with the notification to determine the notification type. In additional and/or alternative examples, the notification classification module 126 can leverage one or more machine learning mechanisms to determine the notification type of a notification, as described above.

Block 612 illustrates determining presentation data based at least in part on the contextual data and the notification type. In some examples, an element may not be associated with presentation data. In such examples, the content determination module 128 may leverage one or more machine learning mechanisms to determine presentation data, as described above. The presentation determination module 128 can apply a data model to the contextual data and data indicating the notification type to determine an orientation, style, message, timing, etc. associated with presenting a notification, as described above. That is, the presentation determination module 128 can apply a data model to the contextual data and data indicating the notification type to determine presentation data associated with the element and notification type.

Block 614 illustrates presenting the notification via the user interface based at least in part on the presentation data. In some examples, the presentation determination module 128 can send the presentation data and the notification to the UI generation module 134, as described above. The UI generation module 134 can access and/or receive the presentation data and the notification and can send the presentation data and the notification to output interface(s) 140. The output interface(s) 140 can enable the device 108 to present the notifications 212 based at least in part on the presentation data. In at least one example, the output interface(s) 140 can cause the notifications 212 to be rendered on a user interface via a display of a device, as described above with reference to FIG. 3.

Figure 7:
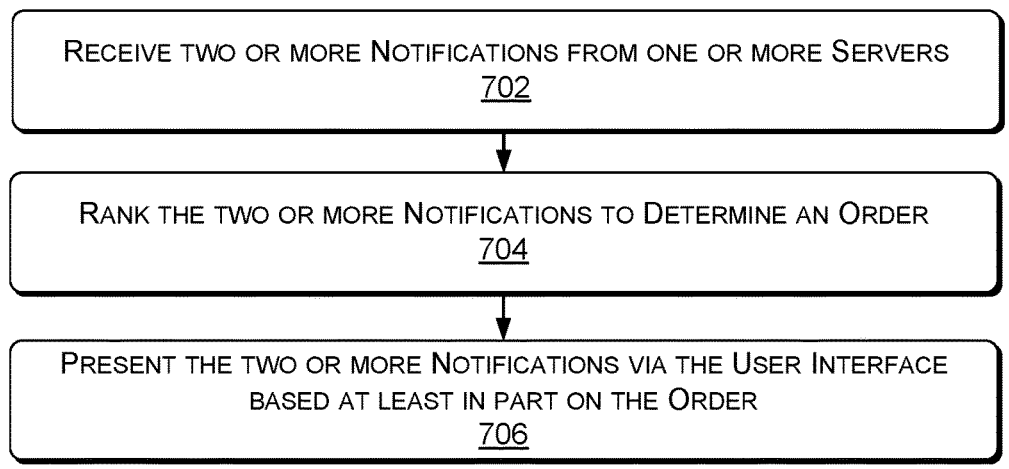
FIG. 7 is a flow diagram that illustrates an example process to rank notifications to determine an order and to present the notifications based at least in part on the order.

FIG. 7 illustrates an example process 700 to rank notifications to determine an order and presenting the notifications based at least in part on the order.

Block 702 illustrates receiving two or more notifications from one or more servers (e.g., server(s) 110). As described above, the communication module 118 can send one or more notifications to the notification classification module 126 and the notification classification module 126 can receive the one or more notifications. The notification classification module 126 can send the one or more notifications to the UI generation module 134 via the presentation determination module 128. In at least one example, the UI generation module 134 can receive more than one notification at substantially the same time.

Block 704 illustrates ranking the two or more notifications to determine an order. The ranking module 136 can rank the notifications 212 to determine an order for presenting the notifications 212, as described above. In at least one example, the ranking module 136 can rank the notifications 212 based at least in part on a severity of the notification. In other examples, the ranking module 136 can rank the notifications based at least in part on the relevance of the first notification and the second notification to the user 106, as described above.

Block 706 illustrates presenting the two or more notifications via the user interface based at least in part on the order. When the UI generation module 134 receives two or more notifications at substantially the same time, the UI generation module 134 can leverage the order determined by the ranking module 136 to determine the order for sending corresponding presentation data and the notification to the output interface(s) 140, as described above. The output interface(s) 140 can present the one or more notifications in the order that they are received.

Example Clauses

A. A client device comprising: one or more processors; and memory that stores one or more modules that are executable by the one or more processors to cause the system to perform operations comprising: receiving input indicating an interaction with an element on a user interface, the element being associated with a region of the user interface; sending, to a serving device, data including an identification of the element and the interaction and a request to implement functionality associated with at least one of the element or the interaction; receiving, from the serving device, a notification indicating that the request succeeded or failed; classifying the notification to identify a notification type; accessing presentation data, the presentation data being based at least in part on the element, a container associated with the element, and the notification type; and presenting the notification via the user interface based at least in part on the presentation data, the notification being presented within a threshold distance of the element on the user interface.

B. A device as paragraph A recites, further comprising a datastore for storing element profiles, wherein the operations further comprise: at a time the element is added to the user interface, mapping the presentation data to an element profile of the element profiles; and accessing the presentation data based at least in part on accessing the element profile in the datastore.

C. A device as either paragraph A or B recites, wherein the presentation data includes an orientation of the notification relative to the element.

D. A device as any of paragraphs A-C recite, wherein the presentation data includes a style for presenting the notification.

E. A device as any of paragraphs A-D recite, wherein the presentation data is further based at least in part on a type of the device.

F. A device as any of paragraphs A-E recite, wherein the region of the user interface is associated with one or more localized functionalities that are separate from and related to a global functionality associated with the user interface.

G. A method for presenting contextual content via a user interface including a plurality of regions having localized functionalities, the method comprising: receiving a first notification from a serving device; determining a first element on the user interface that is associated with the first notification, the first element corresponding to a region of the plurality of regions; classifying the first notification to identify a first notification type; determining a container associated with the first element; accessing first presentation data, the first presentation data being based at least in part on the first element, the container, and the first notification type; and presenting the first notification via the user interface based at least in part on the first presentation data, the first notification being presented within the region or proximate to the region.

H. A method as paragraph G recites, further comprising: receiving a second notification, the second notification being different from the first notification; determining a second element on the user interface that is associated with the second notification, the second element being different from the first element; classifying the second notification to identify a second notification type, the second notification type being different from the first notification type; and accessing second presentation data based at least in part on the second element and the second notification type.

I. A method as paragraph H recites, further comprising: determining a first importance of the first notification; determining a second importance of the second notification; ranking the first notification and the second notification to determine an order, the ranking based at least in part on the first importance and the second importance; and presenting the first notification and the second notification based at least in part on the order.

J. A method as paragraph I recites, further comprising: determining a first severity of the first notification; determining a second severity of the second notification; and ranking the first notification and the second notification further based at least in part on the first severity the second severity.

K. A method as paragraph I recites, further comprising: determining a first relevance of the first notification to a user interacting with the user interface; determining a second relevance of the second notification to the user; and ranking the first notification and the second notification further based at least in part on the first relevance and the second relevance.

L. A method as any of paragraphs G-K recite, wherein presenting the first notification comprises rendering a graphical representation of the first notification within a threshold distance of the first element on the user interface.

M. A method as any of paragraphs G-L recite, wherein presenting the first notification comprises rendering a graphical representation of the first notification in a predetermined position relative to the first element on the user interface.

N. A method as any of paragraphs G-M recite, wherein the first presentation data includes a position and a style associated with rendering the first notification on the user interface.

O. A method as paragraph N recites, wherein the position and the style are based at least in part on a type of the container and a location of the container on the user interface.

P. A method as any of paragraphs G-O recite, further comprising: receiving input indicating an interaction with the first element; sending data indicating the interaction to the serving device; and based at least in part on sending the data, receiving the first notification.

Q. One or more computer-readable media encoded with instructions that, when executed by a processor, configure a computer to perform a method as any of paragraphs G-P recite.

R. A device comprising one or more processors and one or more computer readable media encoded with instructions that, when executed by the one or more processors, configure a computer to perform a computer-implemented method as any of paragraphs G-P recite.

S. A method for presenting contextual content via a user interface including a plurality of regions having localized functionalities, the method comprising: means for receiving a first notification from a serving device; means for determining a first element on the user interface that is associated with the first notification, the first element corresponding to a region of the plurality of regions; means for classifying the first notification to identify a first notification type; means for determining a container associated with the first element; means for accessing first presentation data, the first presentation data being based at least in part on the first element, the container, and the first notification type; and means for presenting the first notification via the user interface based at least in part on the first presentation data, the first notification being presented within the region or proximate to the region.

T. A method as paragraph S recites, further comprising: means for receiving a second notification, the second notification being different from the first notification; means for determining a second element on the user interface that is associated with the second notification, the second element being different from the first element; means for classifying the second notification to identify a second notification type, the second notification type being different from the first notification type; and means for accessing second presentation data based at least in part on the second element and the second notification type.

U. A method as paragraph T recites, further comprising: means for determining a first importance of the first notification; means for determining a second importance of the second notification; means for ranking the first notification and the second notification to determine an order, the ranking based at least in part on the first importance and the second importance; and means for presenting the first notification and the second notification based at least in part on the order.

V. A method as paragraph U recites, further comprising: means for determining a first severity of the first notification; means for determining a second severity of the second notification; and means for ranking the first notification and the second notification further based at least in part on the first severity the second severity.

W. A method as paragraph U recites, further comprising: means for determining a first relevance of the first notification to a user interacting with the user interface; means for determining a second relevance of the second notification to the user; and means for ranking the first notification and the second notification further based at least in part on the first relevance and the second relevance.

X. A method as any of paragraphs S-W recite, wherein presenting the first notification comprises rendering a graphical representation of the first notification within a threshold distance of the first element on the user interface.

Y. A method as any of paragraphs S-X recite, wherein presenting the first notification comprises rendering a graphical representation of the first notification in a predetermined position relative to the first element on the user interface.

Z. A method as any of paragraphs S-Y recite, wherein the first presentation data includes a position and a style associated with rendering the first notification on the user interface.

AA. A method as paragraph Z recites, wherein the position and the style are based at least in part on a type of the container and a location of the container on the user interface.

AB. A method as any of paragraphs S-AA recite, further comprising: means for receiving input indicating an interaction with the first element; means for sending data indicating the interaction to the serving device; and means for, based at least in part on sending the data, receiving the first notification.

AC. A system comprising: a display for presenting a user interface comprising a plurality of regions, a region of the plurality of regions being associated with a localized functionality that is distinct from and related to a global functionality corresponding to the user interface, the region including one or more elements; one or more processors; and memory that stores one or more modules that are executable by the one or more processors to cause the system to perform operations comprising: receiving input indicating an interaction with an element of the one or more elements; and presenting, based at least in part on the interaction, a notification associated with the interaction in at least one of an orientation, a style, or a message that is based at least in part on the element, a container associated with the element, and a type of the notification.

AD. A system as paragraph AC recites, the operations further comprising: based at least in part on receiving the input, sending first data indicating the interaction to a serving device; and receiving the notification from the serving device.

AE. A system as paragraph AD recites, the operations further comprising: based at least in part on receiving the notification, classifying the notification to determine the type of the notification; and accessing presentation data that is mapped to the element, the presentation data indicating the orientation, the style, and the message.

AF. A system as any of paragraphs AC-AE recite, the operations further comprising: determining contextual data associated with the element, the contextual data including at least one of a position of the element on the user interface or a function associated with the element; and determining presentation data associated with the notification based at least in part on the notification, the container, and the contextual data, the presentation data identifying the orientation, the style, and the message.

CONCLUSION

Although the subject matter has been described in language specific to structural features and/or methodological acts, it is to be understood that the subj ect matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A client device comprising:
   one or more processors; and
   memory that stores one or more modules that are executable by the one or more processors to cause the system to perform operations comprising:
   presenting a user interface having a plurality of regions, each region having a localized functionality that does not affect other regions of the plurality of regions;
   receiving input indicating an interaction with an element within a region of the plurality of regions on the user interface;
   sending, to a serving device, data including an identification of the element and the interaction and a request to implement functionality associated with at least one of the element or the interaction;
   receiving, from the serving device, a notification indicating that the request succeeded or failed;
   classifying the notification to identify a notification type;
   accessing presentation data, the presentation data being based at least in part on the element, a container associated with the element, and the notification type, the presentation data indicating a location relative to the element and the region of the plurality of regions for presentation of the notification, a style of the notification, and a message associated with the notification; and
   presenting the message identified from the presentation data, via the user interface, at the location relative to the element and the region of the plurality of regions indicated by the presentation data and in the style indicated by the presentation data.

2. The client device of claim 1, further comprising a datastore for storing element profiles, wherein the operations further comprise:

at a time the element is added to the user interface, mapping the presentation data to an element profile of the element profiles; and accessing the presentation data based at least in part on accessing the element profile in the datastore.

3. The client device of claim 1, wherein the presentation data includes an orientation of the notification relative to the element.

4. The client device of claim 1, wherein the presentation data is further based at least in part on a type of the device.

5. The client device of claim 1, wherein the localized functionality of each region is separate from and related to a global functionality associated with the user interface.

6. A method for presenting contextual content via a user interface including a plurality of regions each having a localized functionality that does not affect other regions of the plurality of regions, the method comprising:

receiving a first notification from a serving device;

determining a first element on the user interface that is associated with the first notification, the first element corresponding to a region of the plurality of regions;

classifying the first notification to identify a first notification type;

determining a container associated with the first element;

accessing first presentation data, the first presentation data being based at least in part on the first element, the container, and the first notification type, the first presentation data indicating a location relative to the first element and the region of the plurality of regions for presentation of the first notification, a style of the first notification, and a message associated with the first notification; and presenting the message identified from the first presentation data, via the user interface, at the location relative to the first element and the region of the plurality of regions indicated by the first presentation data and in the style indicated by the first presentation data.

7. The method of claim 6, further comprising:

receiving a second notification, the second notification being different from the first notification;

determining a second element on the user interface that is associated with the second notification, the second element being different from the first element;

classifying the second notification to identify a second notification type, the second notification type being different from the first notification type; and accessing second presentation data based at least in part on the second element and the second notification type.

8. The method of claim 7, further comprising:

determining a first importance of the first notification;

determining a second importance of the second notification;

ranking the first notification and the second notification to determine an order, the ranking based at least in part on the first importance and the second importance; and presenting the first notification and the second notification based at least in part on the order.

9. The method of claim 7, further comprising:

determining a first severity of the first notification;

determining a second severity of the second notification; and ranking the first notification and the second notification based at least in part on the first severity the second severity.

10. The method of claim 7, further comprising:

determining a first relevance of the first notification to a user interacting with the user interface;

determining a second relevance of the second notification to the user; and ranking the first notification and the second notification based at least in part on the first relevance and the second relevance.

11. The method of claim 6, wherein presenting the message comprises rendering a graphical representation of the message within a threshold distance of the first element on the user interface.

12. The method of claim 6, wherein presenting the message comprises rendering a graphical representation of the message in a predetermined position relative to the first element on the user interface.

13. The method of claim 6, wherein the location and the style are based at least in part on a type of the container and a location of the container on the user interface.

14. The method of claim 6, further comprising:

receiving input indicating an interaction with the first element;

sending data indicating the interaction to the serving device; and based at least in part on sending the data, receiving the first notification.

15. A system comprising:

a display for presenting a user interface comprising a plurality of regions, a region of the plurality of regions having a localized functionality that does not affect other regions of the plurality of regions and that is distinct from and related to a global functionality corresponding to the user interface, the region including one or more elements;

one or more processors; and memory that stores one or more modules that are executable by the one or more processors to cause the system to perform operations comprising:

receiving input indicating an interaction with an element of the one or more elements within the region of the plurality of regions;

accessing presentation data, the presentation data being based at least in part on the element, a container associated with the element, and a notification type, the presentation data indicating a location relative to the element and the region of the plurality of regions for presentation of a notification, a style of the notification, and a message associated with the notification; and presenting, based at least in part on the interaction, the message identified from the presentation data at the location relative to the element and the region of the plurality of regions indicated by the presentation data and in the style indicated by the presentation data.

16. The system of claim 15, wherein the operations further comprise:

based at least in part on receiving the input, sending first data indicating the interaction to a serving device; and receiving the notification from the serving device.

17. The system of claim 16, wherein the operations further comprise:

based at least in part on receiving the notification, classifying the notification to determine the notification type.

18. The system of claim 15, wherein the operations further comprising:

determining contextual data associated with the element, the contextual data including at least one of a position of the element on the user interface or a function associated with the element; and determining the presentation data associated with the notification based at least in part on the notification, the container, and the contextual data.

* * * * *